T. H. FARRINGTON.
WAGON SEAT.
APPLICATION FILED JAN. 3, 1914.

1,134,444.
Patented Apr. 6, 1915.

Attest:
Inventor:
Thomas H. Farrington
by Redding Greeley Goodlett
Attys.

UNITED STATES PATENT OFFICE.

THOMAS H. FARRINGTON, OF OWEGO, NEW YORK.

WAGON-SEAT.

1,134,444.

Specification of Letters Patent.

Patented Apr. 6, 1915.

Application filed January 3, 1914. Serial No. 810,118.

*To all whom it may concern:*

Be it known that I, THOMAS H. FARRINGTON, a citizen of the United States, residing in Owego, in the county of Tioga, in the State of New York, have invented certain new and useful Improvements in Wagon-Seats, of which the following is a specification, reference being had to the accompanying drawings, forming a part thereof.

This invention relates to wagon seats and has for its principal object to provide simple, compact and inexpensive devices to limit the movement of such seats when they are thrown forward to permit the loading or unloading of the wagon and support the seats in their forward position.

A further object is to provide devices of the character referred to which may be readily secured to any wagon seats or wagons regardless of their character and whether they were originally equipped with the improved devices or not.

The invention further seeks to embody in said devices means whereby the amplitude of the forward throw of the wagon seat may be varied at the will of the teamster to suit varying conditions of use or in accordance with the character of the seat or the wagon to which the devices are applied, and the ultimate position of said seat adjusted. In the accompanying drawings are illustrated, by way of example, three practical embodiments of the invention, in one of which the devices are shown as secured to both the wagon seat and the wagon, and in the others are shown as secured solely to the wagon and coöperating directly with the seat.

Reference is now to be had to these drawings for a detailed description of the invention, in which—

Figure 1:
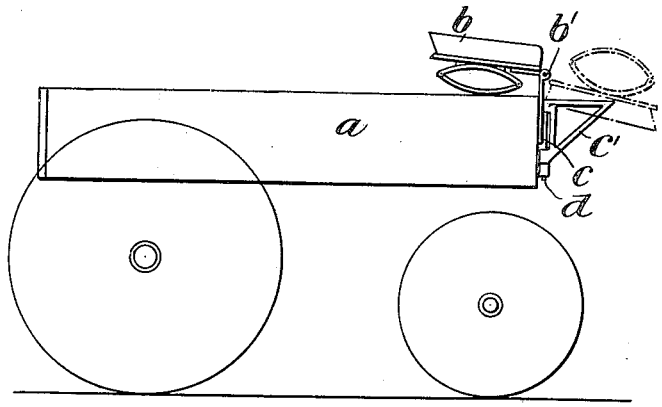
Figure 2:
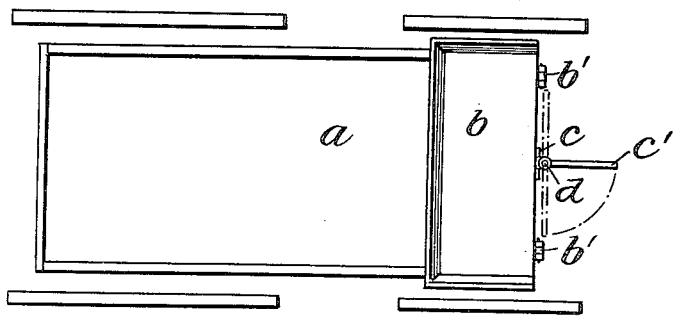
Figure 3:
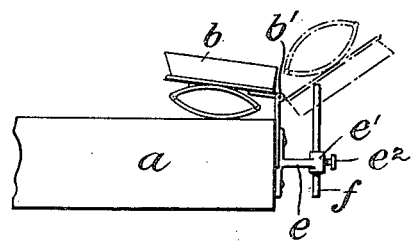

Figure 1 is a conventional representation in side elevation of a wagon equipped with devices embodying the present invention. Fig. 2 is a similar view in plan of the wagon shown in Fig. 1. Fig. 3 is a fragmentary view of a wagon body to which is applied a modified form of the invention.

The wagon body $a$ illustrated herein is shown as having hinged to its front board a wagon seat $b$, although it will be evident as this description proceeds that the invention is not to be limited in its application to any particular form of wagon or wagon seat or to any particular relationship between the wagon and the wagon seat inasmuch as it will be obvious that the wagon seat need not be hinged to the wagon but may merely rest thereon and turn about its base when thrown forward.

In the embodiment illustrated in Figs. 1 and 2 the front wall of the wagon has secured thereto a support $c$ for a bracket $c'$ which is hingedly secured to said support through a suitable pintle pin $d$. The bracket $c'$ normally rests against the front wall of the wagon as indicated in dotted lines in Fig. 2 but may be thrown forward to a position at right angles to the front wall or to any intermediate angular position. It will be evident that when the bracket $c'$ is at right angles to the front wall of the wagon the amplitude of the forward throw of the seat $b$ will be a minimum, whereas for any intermediate angular position of the bracket with respect to the front wall the amplitude of throw will be increased according to such angular position, the effective distance between the front wall of the wagon and the extremity of the bracket determining the extent of throw.

In Fig. 3 is shown a bracket $e$ fixed securely to the front wall of the wagon body and provided with a sleeve $e'$ formed integral therewith and within which may be slidably supported, in a substantially vertical position, a rod $f$. A thumb screw $e^2$ is threaded into the collar $e'$ and coöperates with the rod $f$ in a manner which will be understood, to adjust the position of the latter within the collar. From the description given it will be evident that the height of the rod $f$ with respect to the hinge line $b'$ or any equivalent axis of turning of the seat $b$, may be varied by the teamster to suit changing conditions of use and permit the adjustment of the ultimate forward position of the seat. If desired, the bracket $e$ with its sleeve $e'$ and set screw $e^2$ may be employed as a support for a whip socket or sun shade by removing the sliding rod $f$ from the sleeve. Of course, when the rod $f$ is needed for the practice of the present invention it may be replaced and operated in the manner described. It is to be noted that the embodiments of the invention illustrated in Figs. 1-3 and described above show the devices as secured solely to the wagon body and coöperating directly with the wagon seat for the purpose specified.

The devices illustrated herein are very inexpensive to manufacture and may be readily aplied to any wagon or wagon seat for the purpose of limiting the forward throw of the latter. When these devices are not in use they lie or may be moved into an inactive position to avoid their interference with the load on the wagon and the teamster.

I claim as my invention:

In combination with a wagon body, a wagon seat, a hinge to secure the seat to the body adjacent the front edge of the body to permit the seat to be rotated about the hinge line and thrown forward of the wagon body to an inactive position, and devices to limit the movement of rotation of the seat about the hinge line, including a fixed member secured to the wagon body and an adjustable member mounted on the fixed member, said adjustable member being movable into the path of the seat when the latter is thrown forward and adapted to engage the seat to maintain the same in a predetermined position of rest.

This specification signed and witnessed this 29th day of December, A. D. 1913.

THOMAS H. FARRINGTON.

Signed in the presence of—
FRANK BECK,
ROWENA BECK.

Copies of this patent may be obtained for five cents each, by addressing the "Commissioner of Patents, Washington, D. C."